United States Patent [19]
Lawlor et al.

[11] 3,824,708
[45] July 23, 1974

[54] EDUCATIONAL DEVICE

[75] Inventors: John Lawlor, Tappan, N.Y.; John Sgombick, Ramsey, N.J.

[73] Assignee: Xerox Corporation, Stamford, Conn.

[22] Filed: Dec. 26, 1972

[21] Appl. No.: 318,313

[52] U.S. Cl. ............................................... 35/19 R
[51] Int. Cl. ............................................. G09b 23/12
[58] Field of Search............ 35/19 R; 177/207, 232, 177/233, 254, 264; 128/218 P

[56] References Cited
UNITED STATES PATENTS
3,705,582  12/1972  Stumpf ........................ 128/218 P OTHER PUBLICATIONS
Boyle's Law Apparatus, page 24 of the Project Physics Course Catalog, received Sept. 22, 1972, from Holt, Reinhart & Ewinston.

*Primary Examiner*—Harland S. Skogquist

[57] ABSTRACT

A simple, durable, and inexpensive educational device for demonstrating pressure-volume relationships especially adapted for use by educational institutions below the college level is described. The device comprises a chamber for containing a gas said chamber having openings at its upper and lower end portions. Piston means is provided for selectively controlling the volume and pressure of the gas in the chamber, the piston means capable of being inserted in the chamber through the opening at its lower end portion. Means are included for sealing the upper opening in the chamber. The device also includes means secured the piston at its lower end portion, said means adapted to support a weight, and means for supporting the device.

11 Claims, 5 Drawing Figures

PATENTED JUL 23 1974 3,824,708
SHEET 1 OF 2
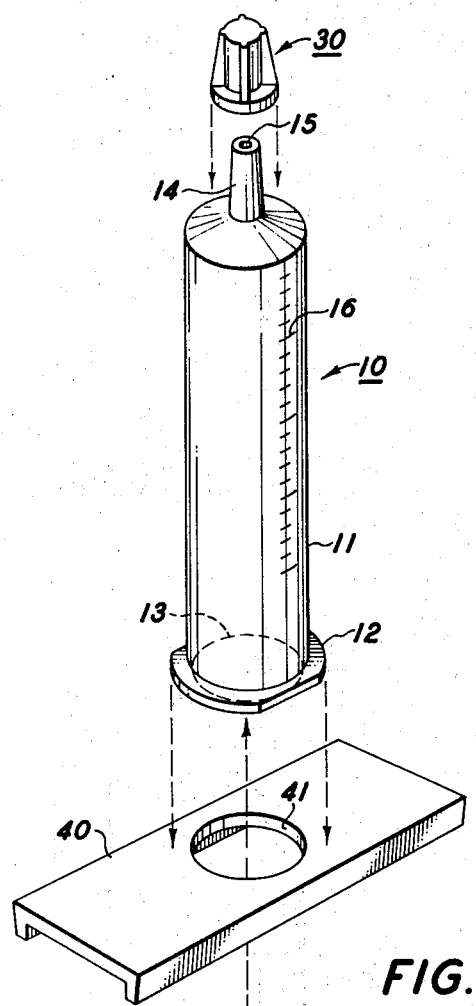
FIG. 1
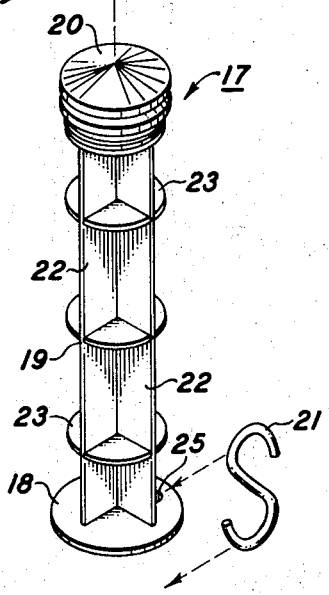
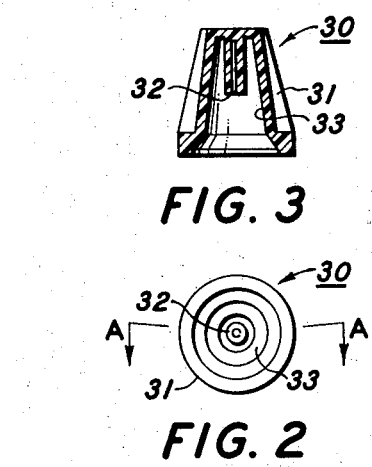
FIG. 3
FIG. 2
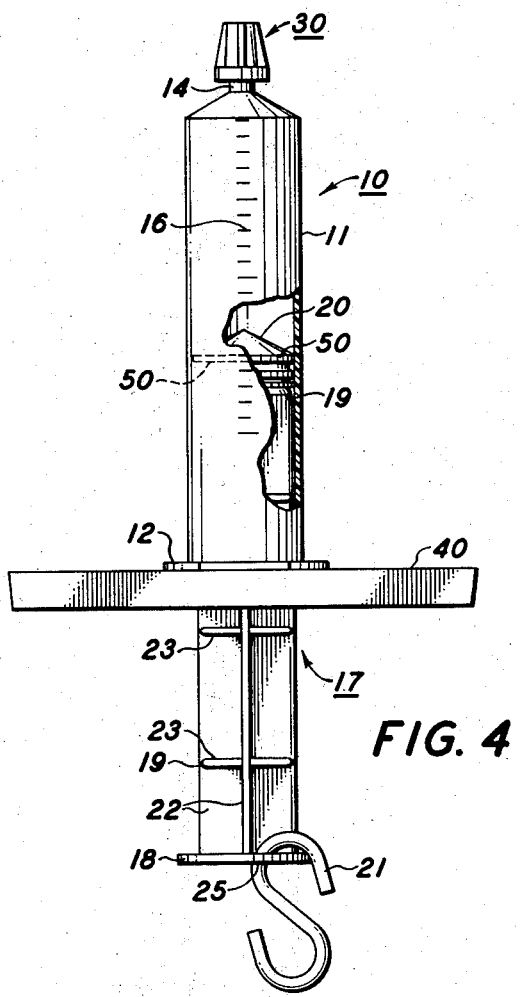
FIG. 4

EDUCATIONAL DEVICE

BACKGROUND OF THE DISCLOSURE

1. Field of the Invention

This invention relates to educational devices, and more particularly to an educational device for demonstrating pressure-volume relationships.

2. Description of the Prior Art

The earliest quantitive description of the effect of pressure on the volume of a confined gas was made by Robert Boyle (1627–1691). The relationship he discovered ($PV$ = constant), known as Boyle's Law, states that for a confined gas the product of pressure of the gas and the volume of the gas remains constant. That is, if the volume of a confined gas is decreased, its pressure will increase (and vice versa) in such a way that the product of pressure and volume will not change.

A device for demonstrating pressure-volume relationships is a fundamental teaching tool for learning institutions, especially for those institutions below the college level. By using such a device not only is the student given the opportunity to learn pressure-volume relationships, but also he is given an opportunity to perform independently the complete sequence of behaviors involved in experimenting: constructing a hypothesis based on observations, designing a test of the hypothesis, interpreting data from the test, describing how the data support or do not support the hypothesis and, if necessary, revising the hypothesis and testing it again. Although efforts have been made to construct simple, relatively inexpensive, rugged, easily assembled and relatively portable educational devices of the type described, known devices, although satisfactory in some respects, do not possess the combined advantages of being relatively inexpensive, rugged, easily assembled and relatively portable when compared to the novel and advantageous device of the present invention.

SUMMARY OF THE INVENTION

It is therefore an object of the present invention to overcome the disadvantages stated hereinabove and to provide an educational device which is simpler, more durable, less expensive, more easily assembled and still more pleasing from a design viewpoint, than prior art devices and otherwise more suitable for use in learning institutions below the college level.

It is a further object of the present invention to provide an educational device for demonstrating pressure-volume relationships.

It is a further object of this invention to provide an educational device which is compact when assembled.

It is a further object of this invention to provide an educational device which is easily assembled and quickly disassembled for easy storage in a very small space.

It is a further object of this invention to provide an educational device which does not require a single screw, bolt, rivet or similar fastening type connection.

It is still a further object of this invention to provide an educational device which, in addition to its educational features and many mechanical advantages, possesses a pleasing design.

The foregoing objects and others are accomplished in accordance with the present invention by providing an educational device comprising a chamber for containing a gas, said chamber having openings at its upper and lower end portions, piston means for selectively controlling the volume and pressure of the gas in said chamber, said piston means capable of being inserted in said chamber through said opening in the lower end portion of said chamber; means for sealing the opening in the upper end portion of said chamber; means secured to said piston at its lower end portion, said means adapted to support a weight; and means for supporting said device.

BRIEF DESCRIPTION OF THE DRAWINGS

For a better understanding of the invention as well as other objects and further features thereof, reference is made to the following detailed disclosure of this invention taken in conjunction with the accompanying drawings wherein:

FIG. 1 is a perspective view of a preferred embodiment of an educational device in accordance with the invention shown in disassembly with the component parts shown in relative position;

FIG. 2 is a top view of a preferred embodiment of the sealing means as shown in FIG. 1;

FIG. 3 is a sectional view of the sealing means taken along line A—A of FIG. 2;

FIG. 4 is a partially sectioned front view of an assembled device in accordance with the invention.

DESCRIPTION OF THE PREFERRED EMBODIMENTS

Figure 5:
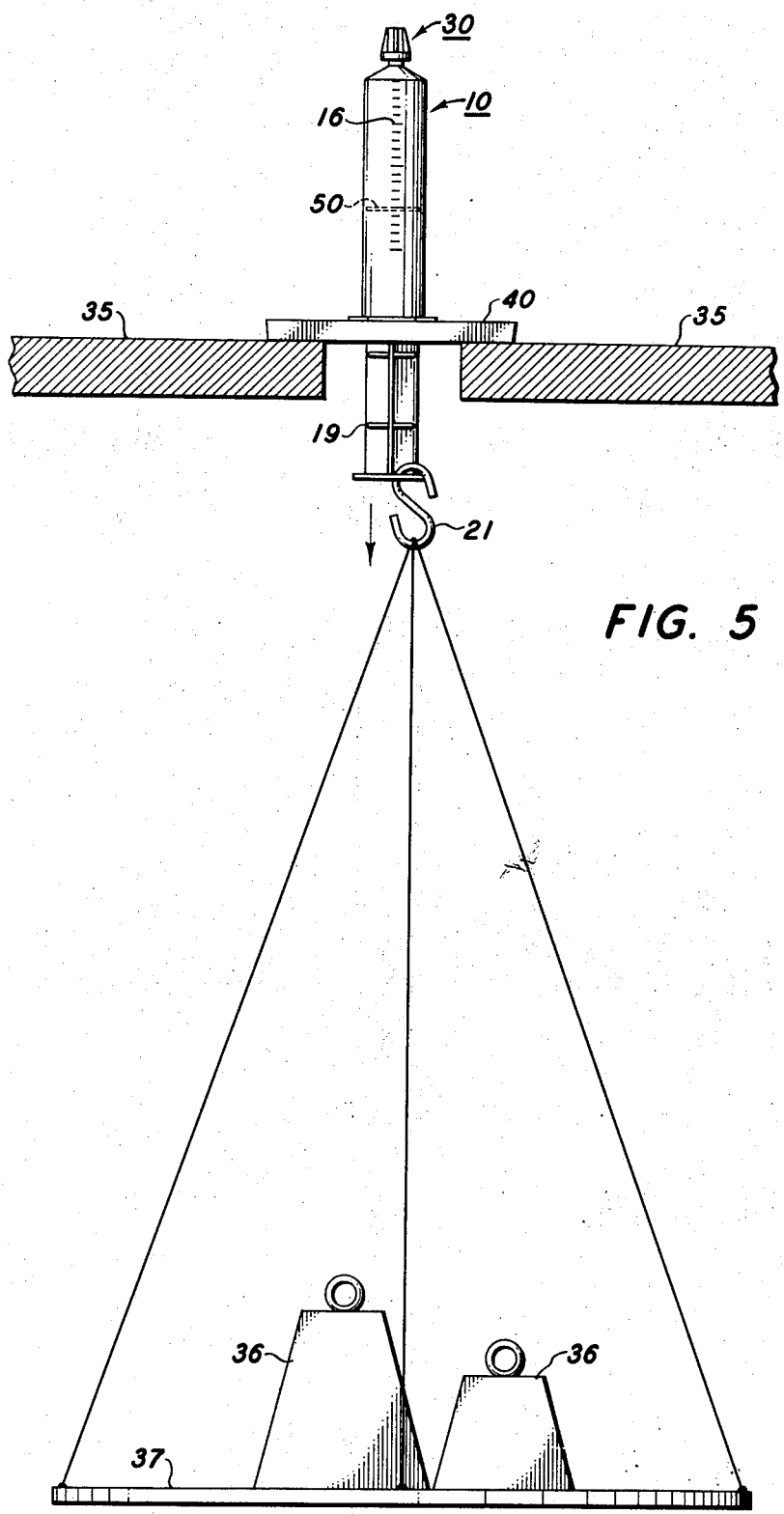
FIG. 5 is a front view of an assembled device in accordance with the invention supported on a support surface.

Referring now to FIG. 1, the educational device in accordance with the features of this invention is shown in disassembly for ease of understanding to comprise a chamber 10 for containing a gas, such as for example, air. The chamber preferably includes a tubular body 11 having flange 12 which surrounds a substantially circular opening 13 located at the bottom end portion of the chamber. Extending vertically from the top portion of the chamber is nozzle 14 which includes an opening 15 at its tip which is substantially smaller than opening 13. Located along the outer surface of tubular body 11 is a calibrated scale 16 which enables one to measure the volume of gas within the chamber, the scale preferably being marked in units of cubic centimeters. In accordance with the invention the size of the chamber 10 can vary. Thus, for example, chambers calibrated to contain 20cc, 40cc, 60cc, etc. of a gas can be used.

Piston means 17 which is inserted into chamber 10 through opening 13 for varying the volume and/or pressurizing the gas within the chamber includes surface 18, elongated member 19, and a rubber tip member 20. Surface 18 is employed to enable one to apply a force to elongated member 19 and thereby alter the volume and/or pressure of the gas within the chamber. This can be accomplished in numerous ways. For example, in accordance with a preferred embodiment of the present invention, a downward force can be applied to piston means 17 by securing an S-shaped hook 21 to surface 18 and by securing a weight or plurality of weights to the hook. This is clearly shown in FIG. 5. Although an S-shaped hook is disclosed as a preferred embodiment, the hook can be any hooking device which can be secured to surface 18 and also support a weight as illustrated. Elongated member 19 which extends vertically from surface 18 is preferably constructed of a plurality of vertical ribs 22 and a plurality of substantially circular horizontal ribs 23 which intersect the vertical ribs along their length. These ribs impart strength and rigidity to the elongated member and the overall piston structure. The physical dimensions of ribs 22 and 23 permit elongated member 19 to be inserted within chamber 10 through opening 13 without causing frictional contact between the ribs and the inside surface of tubular body 11 as the piston is inserted and withdrawn from chamber 10. Secured to the top portion of elongated member 19 is a substantially circular rubber tip member 20 whose diameter is such that when it is inserted within tubular body 11 it can slide back and forth within the tubular body and also create a seal. Thus, for example, when piston means 17 is inserted within opening 13 and downward force is applied to surface 18, the pressure of the gas within tubular body 11 will be lowered to below atmospheric pressure, when the opening in nozzle 14 is closed. Rubber tip member 19 is constructed to be in releasable engagement with the bottom portion of piston 17.

To securely seal the opening in nozzle 14 cap 30 is provided. As shown in FIGS. 2 and 3, cap 30 includes a cup-like body 31 with an upstanding internal projection 32. When cap 30 is placed over the top portion of the nozzle, projection 32 is inserted within opening 15 in the nozzle and the wall of the nozzle rests within shoulder 33.

The device is supported between two surfaces 35 as shown in FIG. 5 by a support means in the form of bracket member 40. Preferably, bracket 40 is in the form of a channel member which provides additional strength to the overall device when a force is applied thereto. As shown in FIG. 1 bracket 40 includes circular opening 41 which allows piston 17 to be inserted through the bracket and into chamber 10. Flange 12 provides the necessary support for securely holding chamber 10 on the bracket over opening 41. Although a preferred shape for bracket 40 is rectangular, the bracket could be constructed in the form of other shapes, such as for example, a square.

In operating the educational device described herein piston means 17 including rubber tip member 20 secured to the top portion of the piston is inserted into opening 41 in bracket 40 and then into opening 13 in chamber 10. To allow the piston to move freely up and down within tubular body 11 it is preferred to lubricate the rubber tip 20 with a lubricant, such as for example, a liquid detergent, glycerine, etc. Hook 21 can then be secured to surface 18 by insertion within opening 25. To put a desired volume of gas into the chamber, the piston is pushed into the chamber by applying a force on supporting surface 18 until the bottom portion of rubber tip 20 coincides with the desired volume of gas as indicated on calibrated scale 16. The rubber tip member includes at least one rib 50 which appears as a dark line when viewed from the outside of tubular body 11 when the piston is inserted with the tubular body. This effect is achieved by employing a tubular body constructed of a translucent material. This creates a readout indicator which enables one to read the volume of gas within the cylinder. When the desired volume of gas is enclosed with the chamber 10, cap 30 is placed securely on nozzle 14. Thereafter, the device can be supported between two support surfaces 35, such as for example, two tables. This is illustrated in FIG. 5.

In accordance with the present invention various suitable materials may be used for manufacturing the various parts of the educational device herein described. However, in accordance with the preferred embodiments of this invention, the chamber 10, piston means 17, sealing means 30 and bracket 40 are all preferably constructed of plastic. In accordance with the disclosed embodiment it is particularly preferred that the chamber 10 be constructed of a translucent plastic. Furthermore, it is preferred that hook 21 be formed of a metal.

The educational device of the present invention is designed to allow the student to study pressure-volume relationships in numerous ways. The students can measure the volume of a confined gas at various pressures both above and below atmospheric pressure. Students can graph and interpret data which requires that a distinction be made between force and pressure, and this leads to an operational definition or pressure. While working with the educational device of this invention, the students will also be concerned with the concept of force and also with the area on which a force is acting (pressure is force per unit area).

By applying a force in the form of weights 36 as shown in FIG. 5 the students can be taught that when the downward force on the piston 17 is greater than the upward force that is due to the pressure of the atmosphere, the piston will move down. Further, the downward force on the piston can be increased by increasing the weight. In this activity the students can be taught that when the force down is just a little greater than the force of the atmosphere pushing up on the piston, the piston would keep moving down.

By using an educational device in accordance with the present invention students can be taught the amount of pressure exerted by the atmosphere. This can be accomplished by setting up the device as shown in FIG. 5. Before adding weights 36 to platform 37, cap 30 is removed from nozzle 14 and piston 17 is pushed into chamber 10 as far as it will go without jamming, and then cap 30 is replaced on the nozzle. The force down on the piston is the sum of the force exerted by the weights, platform and the force exerted by the gas in the chamber. However because of the extremely small amount of gas in the chamber, this force factor can be ignored. Weights are added to platform 37 until the piston keeps moving down and finally falls out of the cylinder. By knowing the total downward force and the diameter of the piston, the pressure on the piston when it fell out of the chamber, or atmospheric pressure can be calculated.

The types of experiments which can be performed by students using the educational device of this invention are explained in detail in "Science — A Process Approach/Part G, Pressure-Volume Relationships" published by the American Association for the Advancement of Science.

It will be seen from the foregoing description that a very simple, durable and relatively inexpensive educational device for demonstrating pressure-volume relationships has been devised. The educational device described herein has the additional advantages of being rugged, easily assembled, relatively portable and demonstrates the ability to perform experiments which can be substantially duplicated.

While we have illustrated and described a particular embodiment of our invention, it will be understood that various modifications may be made therein without departing from the spirit of the invention and the scope of the appended claims.

We claim:

1. An educational device for demonstrating pressure-volume relationships comprising a chamber for containing a gas, said chamber having openings at its upper and lower end portions and a flange surrounding said opening on the lower end portion of the chamber; piston means for selectively controlling the volume and pressure of the gas in said chamber, said piston means capable of being inserted in said chamber through said opening in the lower end portion of said chamber; means for sealing the opening in the upper end portion of said chamber; means secured to said piston at its lower end portion, said means adapted to support a weight; and support means for supporting said device said support means including an opening adapted to permit said piston means to be inserted therein and a surface upon which said flange supports the chamber on said support means over the area of said opening.

2. An educational device according to claim 1 wherein said chamber includes a tubular body having a nozzle extending from its upper end portion, one of said openings being in the upper portion of said nozzle.

3. An educational device according to claim 2 wherein said tubular body includes a calibrated scale extending vertically along said body to indicate the volume of gas within said chamber.

4. An educational device according to claim 1 wherein said lower opening is larger than said upper opening.

5. An educational device according to claim 1 wherein said gas is air.

6. An educational device according to claim 1 wherein said piston means comprises an elongated member, a support surface secured to one end of said elongated member and a rubber tip member secured to the opposite end of said elongated member, said rubber tip member being adapted to slide within said chamber and create a seal within said chamber.

7. An educational device according to claim 6 wherein said elongated member includes a plurality of vertical ribs intersected at intervals along their length by a plurality of substantially circular ribs.

8. An educational device according to claim 1 wherein said chamber is constructed of a translucent plastic.

9. An educational device according to claim 2 wherein said sealing means is a cap adapted to be placed over the opening in said nozzle.

10. An educational device according to claim 1 wherein said means for supporting a weight comprises an S-shaped hook.

11. An educational device according to claim 1 wherein said support means is in the form of a channel member.

* * * * *